United States Patent [19]

Theissig

[11] 4,260,916
[45] Apr. 7, 1981

[54] ELECTRIC MOTOR DRIVEN HAND-HELD DRILL

[75] Inventor: Werner Theissig, Munich, Fed. Rep. of Germany

[73] Assignee: Hilti Aktiengesellschaft, Schaan, Liechtenstein

[21] Appl. No.: 68,491

[22] Filed: Aug. 21, 1979

[30] Foreign Application Priority Data

Aug. 25, 1978 [DE] Fed. Rep. of Germany ....... 2837254

[51] Int. Cl.$^3$ .............................................. H02K 7/14
[52] U.S. Cl. ........................................ 310/50; 310/43
[58] Field of Search ............................ 310/47, 50, 43

[56] References Cited

U.S. PATENT DOCUMENTS

| 3,401,281 | 9/1968 | Martin et al. | 310/43 X |
| 3,432,703 | 3/1969 | Sheps et al. | 310/43 X |
| 3,444,402 | 5/1969 | Cartier | 310/43 |
| 4,135,106 | 1/1979 | Jollois | 310/43 X |

Primary Examiner—Donovan F. Duggan
Attorney, Agent, or Firm—Toren, McGeady and Stanger

[57] ABSTRACT

In a hand-held drill driven by an electric motor, the motor stator is positioned within a metal casing. A plastic layer covers the interior surface of the metal casing and laterally encloses the stator. Openings are formed through the metal casing between its interior and exterior surface and the plastic layer is held in interlocking engagement within these openings.

7 Claims, 3 Drawing Figures

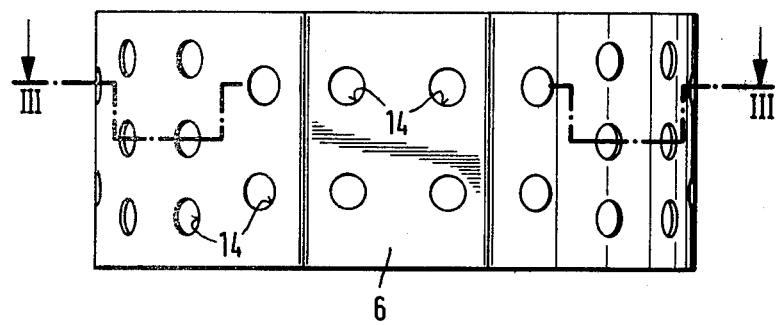
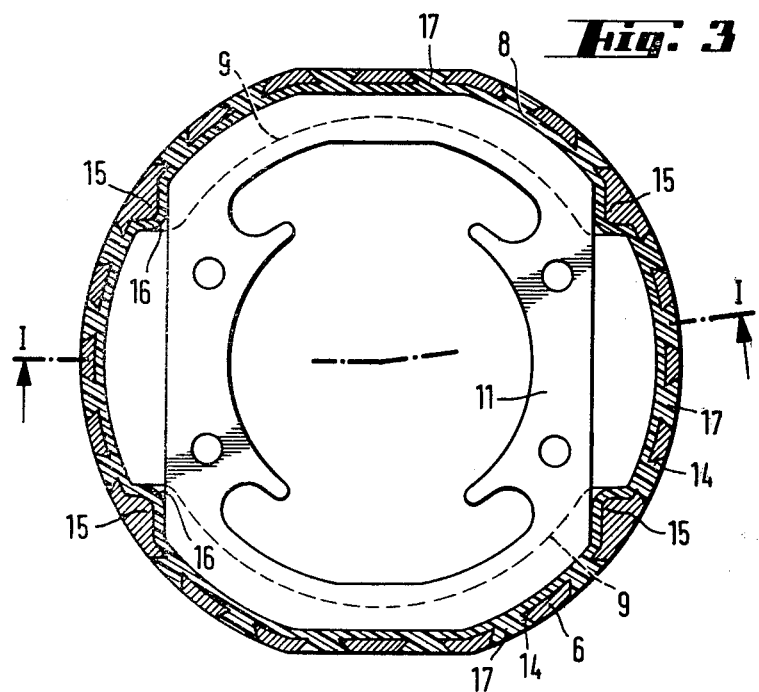

ELECTRIC MOTOR DRIVEN HAND-HELD DRILL

SUMMARY OF THE INVENTION

The present invention is directed to a hand-held drill driven by an electric motor with the stator of the motor mounted in a metallic casing with a plastic layer positioned between the inner surface of the casing and the stator.

Hand-held drills and similar tools operated by an electric motor require for safety reasons an electrically insulated arrangement of the stator within the casing of the tool. In known tools, the armature stampings of the stator are positioned in a metallic motor casing with an intermediate plastic layer surrounding the stator and serving as insulation. This layer is designed, for example, as a dish which is inserted into the motor casing and is fixed in position by frictional engagement with the casing or by adhesive attachment.

Experience has shown that such an intermediate layer does not afford adequate support so that the motor casing is able to absorb forces developed at the start of the motor without some displacement. The disadvantage of displacement of the intermediate layer relative to the motor casing is particularly manifest in tools which are also exposed to vibration, as is the case with a drill. When the intermediate layer is displaced, it must be reattached or replaced, which requires elaborate repairs.

In a known machine, to obtain a better support of the intermediate layer in the motor casing, a plastic adhesive is introduced into the gap between the armature stampings of the stator and the motor casing. The interior surface of the motor casing and the outside of the stator facing toward the casing are provided with depressions so that, in addition to the adhesive joint, the plastic adhesive forms a type of form-locking support.

This solution has a considerable disadvantage in that the intermediate layer must be relatively thick to ensure the transmission of forces developed by the motor without causing any displacement. Further, the use of such an intermediate layer in combination with the motor casing and stator frequently results in large dimensions and great weight. In hand-held tools, however, low weight and compact design are especially desirable features.

Therefore, the primary object of the present invention is to provide a hand-held drill driven by an electric motor in which the stator is safely supported within a motor casing which affords great inherent stability and compact design for the drilling tool.

In accordance with the present invention, the motor casing is provided with openings between its interior and exterior surfaces so that the intermediate layer extends into the openings and provides a form-locking engagement with the casing.

Preferably, the intermediate layer is inserted by injection molding with the plastic flowing into the openings so that a reliable form-locking interengagement of the intermediate layer surrounding the stator is provided with the motor casing, once the plastic has hardened. A plurality of the openings are distributed around the entire circumference of the annular motor casing to enhance the distribution of the forces. The openings can have different shapes, for example they may have a round, square or other cross section.

The reliable support of the intermediate layer afforded by the openings, both in the axial direction and in the direction of rotation of the motor, permits a relatively thin-walled design so that the overall thickness of the intermediate layer and the motor casing is relatively small compared to known constructions. By providing a compact and relatively light-weight design of the motor, it is possible to provide a similar design of the drill itself. The space saving arrangement of the motor is specially desirable when the motor is enclosed in a tool housing providing protection of the motor.

To increase the radial support of the intermediate layer, the openings through the casing are formed so that the surfaces of the openings diverge toward the exterior surface of the motor casing. With the resulting undercut arrangement of the openings, radial displacement is positively prevented even under temperature differentials which result in expansion and contraction of the intermediate layer and the motor casing.

To hold the stator in position, the motor casing, in accordance with another feature of the invention, has supporting shoulders projecting inwardly from the interior surface of the casing with the shoulders covered by the intermediate layer. The torque acting on the stator is at least partially transmitted through the combination of the intermediate layer and the supporting shoulders to the motor casing. The parts of the intermediate layer extending into the openings in the motor casing absorb only a residual amount of the torque. The forces generated in the axial direction of the motor are absorbed jointly by the openings in the motor casing and the parts of the intermediate layer protruding into such openings.

To counteract the forces generated by the stator and acting through the intermediate layer in the region of the supporting shoulders, the motor casing is provided with a greater number of openings in the region of the supporting shoulders than in the regions spaced from the shoulders. Consequently, certain parts of the intermediate layer engage openings in the motor casing in regions more particularly exposed to the action of the stator as compared to other regions of the motor casing so that there is a better distribution of the forces and the stress acting on the parts of the layer within the individual openings is reduced.

A particularly suitable material for the intermediate layer is a thermoplastic material.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 2 is an elevational view of the motor casing shown on an enlarged scale; and FIG. 3 is a sectional view of the motor casing containing an intermediate layer and armature stampings of the stator taken along the line III—III in FIG. 2.

DETAIL DESCRIPTION OF THE INVENTION

Figure 1:
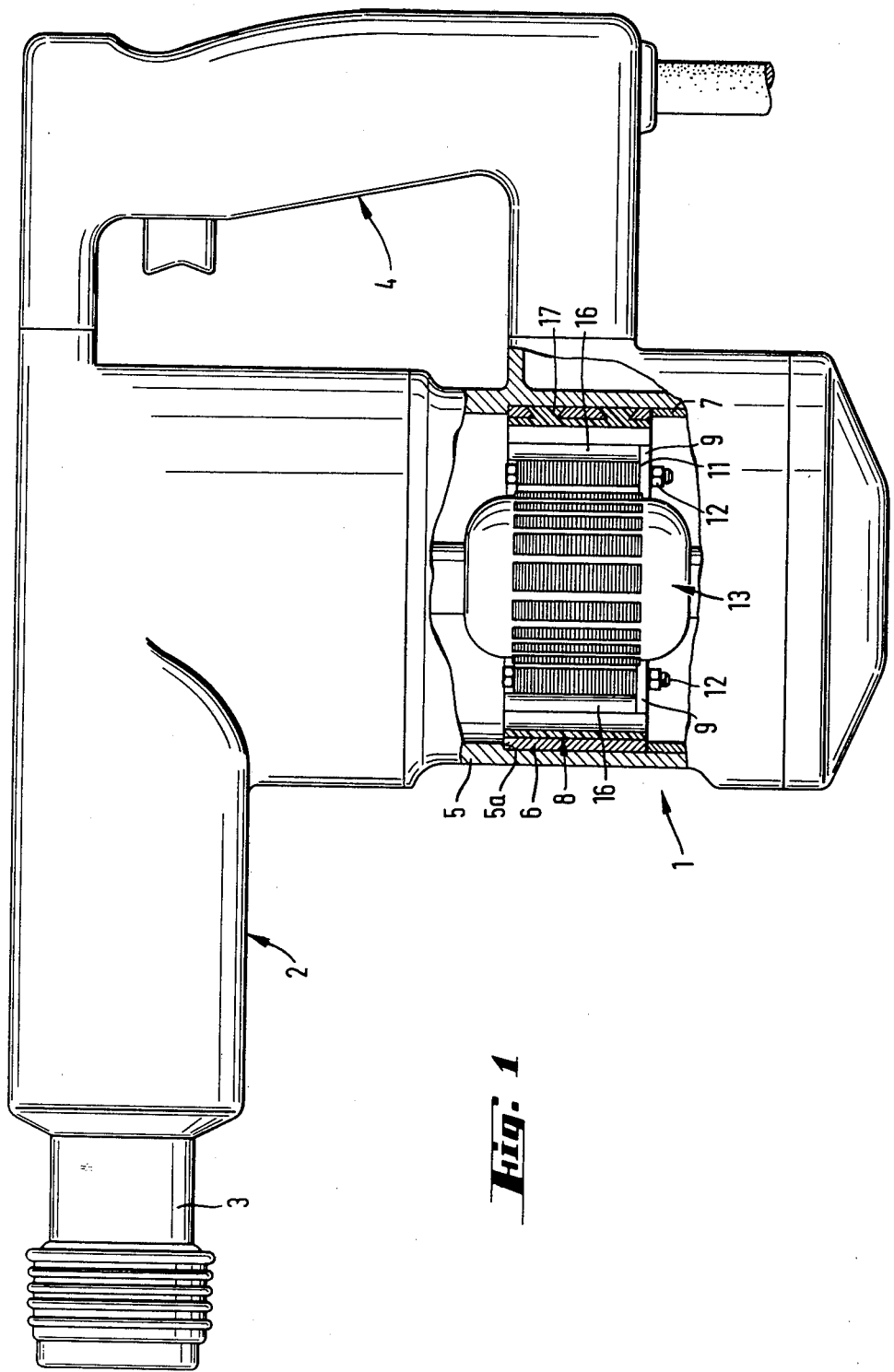
FIG. 1 is a side view of a hammer drill driven by an electric motor with the portion containing the motor being shown in section along the line I—I in FIG. 3.

In FIG. 1 a hammer drill is illustrated driven by an electric motor 1 with a striking tool portion 2 and a tool receptacle or chuck 3 extending from the front end of the striking tool portion. A handle 4 is located on the rear or right-hand end of the tool and extends between the striking tool portion 2 and the motor 1.

The motor 1 is located within a housing 5 and is laterally enclosed within a metallic casing 6. The exterior surface of the casing 6 fits against the inner surface of the housing 5 with a ring 7 supporting the lower end of the casing 6 and a shoulder 5a formed on the housing 5 supporting the upper end of the casing. The shoulder 5a and the ring 7 fixes the axial position of the motor casing 6. The interior surface of the motor casing 6 is lined with an intermediate plastic layer 8. Two traverses 9 are disposed on opposite sides of the lower end of the casing 6. The armature stampings of a stator 11 are supported on the traverses 9 and are secured to the traverses by screw joints 12. A rotor 13 is rotatably mounted in a known manner. For reasons of simplicity, details not essential to the invention, such as the winding course and the motor mount, are not illustrated in the drawing.

In FIG. 2 openings 14 having a circular cross section are shown extending through the motor casing 6 from its interior surface to its exterior surface. As can be seen in FIG. 2, certain portions of the casing which absorb the greatest amount of force from the stator 11 have axially extending rows containing three openings each. In the remaining regions of the motor casing, the vertical rows only contain two openings 14. The regions with the rows of two openings absorb less of the force developed by the stator. The rows of three openings 14 provide improved distribution of the forces from the stator 11 into the motor casing 6.

In FIG. 3 the regions of the motor casing 6 which absorb the greatest forces from the stator 11 are provided with axially extending supporting shoulders 15. The shoulders 15 are covered by the intermediate layer 8 so that rib-shaped bulges or projections 16 are formed inwardly from the interior surface of the motor casing whereby the armature stampings of the stator bear against the projections and prevent rotation. In addition, the traverses 9 can be noted on opposite sides of the casing extending between the shoulders with the armature stampings of the stator bearing on the traverses. Circular openings 14 widen frusto-conically from the interior surface to the exterior surface of the motor casing 6. The parts 17 of the intermediate layer 8 which extend into the openings 14, afford a form-locking interengagement as is also shown in FIG. 1.

While specific embodiments of the invention have been shown and described in detail to illustrate the application of the inventive principles, it will be understood that the invention may be embodied otherwise without departing from such principles.

What is claimed is:

1. Hand-held drill including an electric motor for driving said drill, said motor including a stator having a central axis, a motor casing laterally enclosing said stator, a plastic layer located between the interior surface of said motor casing and said stator laterally encircling said stator and lining the interior surface of said motor casing laterally outward of said stator, wherein the improvement comprises that said motor casing has a plurality of openings extending therethrough from the interior to the exterior of said casing in the region located laterally outwardly from said stator, said plastic layer being interlocked with said motor casing in the openings therethrough, each of said openings being laterally defined by an annular surface extending between the interior surface and exterior surface of said motor casing, and said annular surfaces being in diverging relationship from the interior surface to the exterior surface of said motor casing.

2. Hand-held drill, as set forth in claim 1, wherein said motor casing is annularly shaped and has a central axis coextensive with the central axis of said stator, shoulders formed on and extending inwardly from the interior surface of said casing in the region located laterally outwardly from said stator, said shoulders extending in the axial direction of said casing, said plastic layer covering said shoulders and the combination of said shoulders and plastic layer forming inwardly extending projections disposed in form-locking engagement with said stator.

3. Hand-held drill, as set forth in claim 2, wherein said casing having first regions and second regions laterally encircling said stator with said first regions being located adjacent to said shoulders and second regions spaced from said shoulders and located between said first regions, and said first regions having a greater number of openings therethrough than said second regions.

4. Hand-held drill, as set forth in claim 1, wherein said plastic layer comprises a thermoplastic material.

5. Hand-held drill, as set forth in claim 4, wherein said motor casing is formed of a metal.

6. Hand-held drill, as set forth in claim 2, including a housing, said motor casing secured within said housing, and means in said housing for engaging the opposite ends of said casing for fixing the position of said casing within said housing.

7. Hand-held drill, as set forth in claim 2, including traverse members located within said motor casing and located on the opposite sides of said casing, said traverse members supporting said stator.

* * * * *